United States Patent

[11] 3,615,259

| [72] | Inventor | Ulrich E. G. Neitzel<br>Odgen, Utah |
|---|---|---|
| [21] | Appl. No. | 807,573 |
| [22] | Filed | Mar. 17, 1969 |
| [45] | Patented | Oct. 26, 1971 |
| [73] | Assignee | Great Salt Lake Minerals and Chemicals Corporation<br>Ogden, Utah<br>Continuation-in-part of application Ser. No. 735,840, June 10, 1968, Continuation-in-part of application Ser. No. 756,071, Aug. 28, 1968. |

[54] SOLAR POND SYSTEM FOR THE PRODUCTION OF CONCENTRATED BRINES UTILIZING PLURAL SERIAL SOLAR SUBZONES
10 Claims, 3 Drawing Figs.

[52] U.S. Cl. ............................................. 23/298,
    23/38, 23/91, 23/128, 23/304, 23/302, 159/1
[51] Int. Cl. .......................................................... B01d 9/00
[50] Field of Search ........................................... 159/15, 49,
    47; 23/303, 312 AH, 304, 297, 298, 38, 121, 128, 91

[56] References Cited
UNITED STATES PATENTS

| 681,407 | 8/1901 | Coward | 159/1 |
|---|---|---|---|
| 1,353,283 | 9/1920 | Silsbee | 23/297 |
| 1,432,796 | 10/1922 | Silsbee | 23/297 |
| 3,099,528 | 7/1963 | Hadzeriga | 23/38 |
| 3,432,031 | 3/1969 | Ferris | 23/121 |
| 3,484,195 | 12/1969 | Lewis et al. | 23/121 |

FOREIGN PATENTS

| 67,461 | 12/1959 | India | |

*Primary Examiner*—Wilbur L. Bascomb, Jr.
*Attorney*—David V. Trask

ABSTRACT: A solar evaporation zone receives a brine of a given concentration with respect to a particular soluble salt and produces effluent brine of a higher concentration with respect to that salt. A crystal crop of other salts, characterized by a propensity to entrain a high weight-percent of brine, is deposited in the zone. The zone is subdivided into a plurality of subzones arranged for series flow so that the densest brine in the evaporation zone is contacted by a relatively small portion of the crystal crop. As a result, the yield of concentrated brine from the evaporation zone is increased.

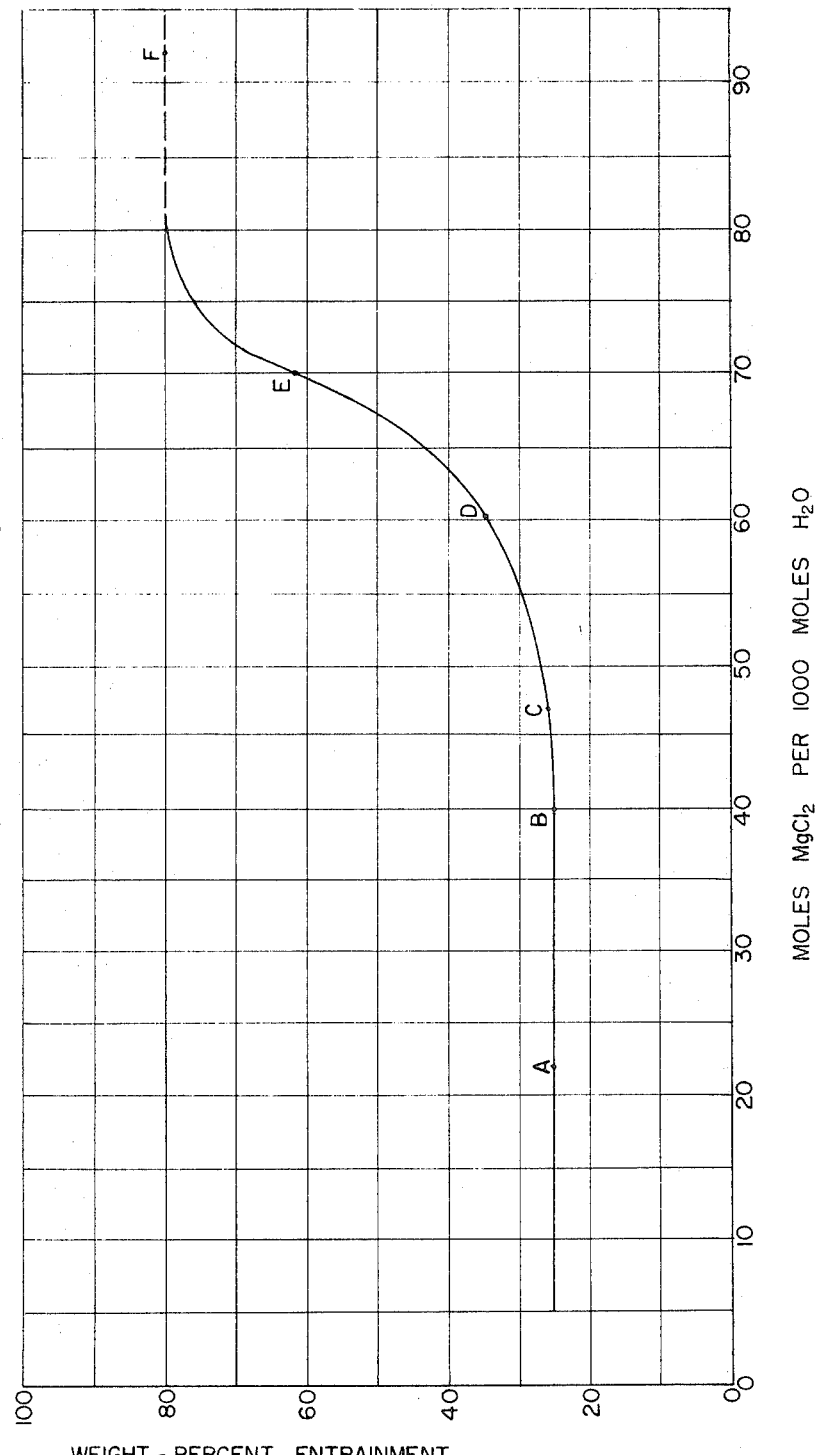

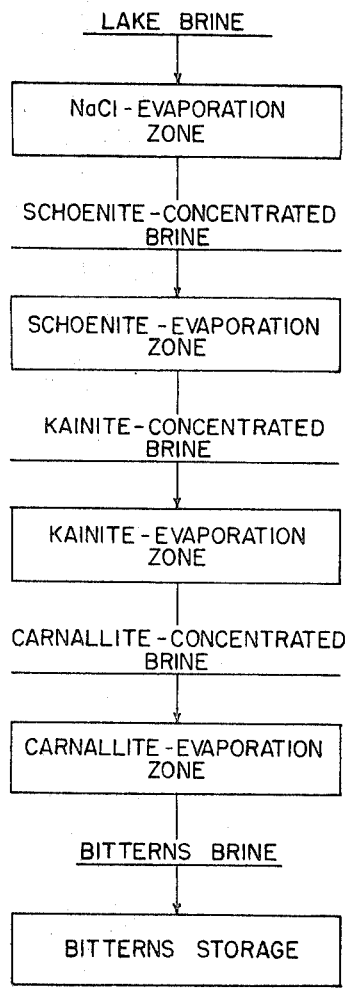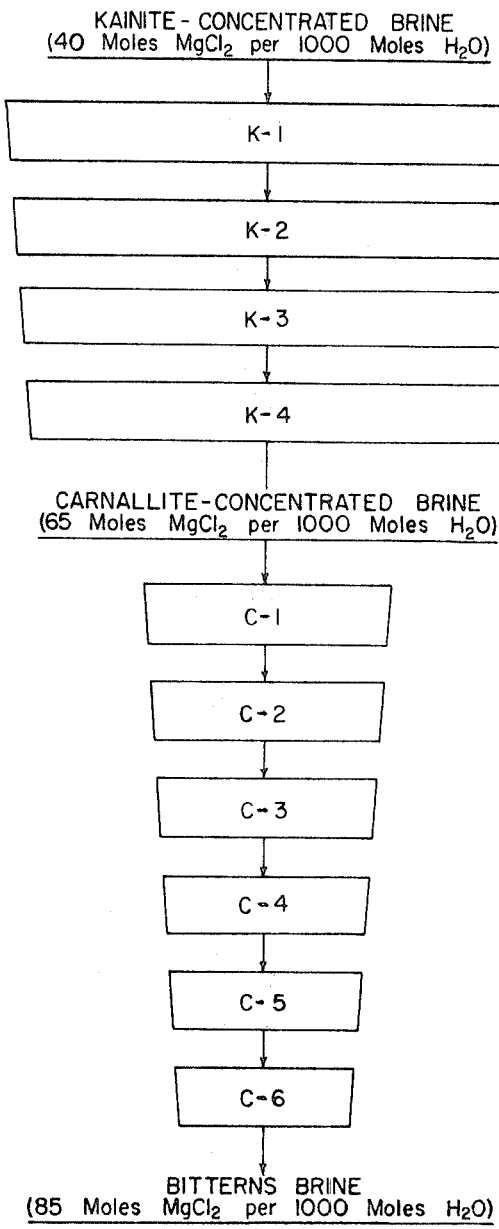

SOLAR POND SYSTEM FOR THE PRODUCTION OF CONCENTRATED BRINES UTILIZING PLURAL SERIAL SOLAR SUBZONES

CROSS REFERENCE TO RELATED APPLICATIONS

The present application is a continuation-in-part of previously filed commonly assigned, copending applications Ser. Nos. 735,840, filed June 10, 1968; and 756,071, filed Aug. 28, 1968. The aforesaid Ser. No. 735,840, discloses and claims a method for producing various desired crystal crops in isolated solar pond areas; the nature of the carnallite crystal crop and its propensity to entrain substantial quantities of $MgCl_2$-concentrated brine is disclosed. Ser. No. 756,071 specifically teaches that solar pond systems of the type disclosed and claimed in the earlier-filed application may include large solar evaporation zones subdivided into a number of subponds arranged for series flow.

BACKGROUND OF THE INVENTION

1. Field

This invention pertains to the selective recovery of commercially important materials from brines by solar evaporation. It is particularly directed to the production of high-density brines, notably magnesium chloride bitterns brines.

2. State of the Art

It is well known to evaporate brines to effect the deposition of particular crystal species. The residual brine formed as a result of this evaporation is concentrated with respect to soluble salts initially contained in the brine at less than saturated concentration and is itself a potential source of valuable minerals. This brine is commonly referred to as "bitterns brine" when it results from the evaporative concentration of sea water or other brines in the salt or potash industries. Such brines typically contain magnesium salts, notably magnesium chloride, as the most soluble major salt constituent. Brines which contain little or no dissolved magnesium may be evaporated to produce residual brines concentrated with respect to other salts or minerals, such as $KCl$, $LiCl$, $Li_2CO_3$, glaserite, trona, etc. The preparation of brines concentrated with respect to a particular salt or mineral usually involves the precipitation from the brine of a crystal crop predominating in other salts or minerals.

The preparation and recovery of residual brines of the aforedescribed type would appear to be a simple procedure. Concentrating brine with respect to potassium and lithium salts usually involves evaporating the brines to remove sodium chloride. The sodium chloride may be recovered but is more often discarded. Dense magnesium chloride brines have been prepared experimentally from natural brines by solar evaporation in small pans. Bitterns brines have been produced in evaporation plants of the potash and salt industries. Separation of entrained brines from the crystallized products in these instances has been accomplished by mechanical means, notably centrifugation.

The preparation of such brines in large. solar evaporation zones presents special technical problems and cannot always be accomplished effectively be the procedures found effective in small scale experiments or chemical processing equipment. Evaporation ponds are typically of earthen construction and are thus pervious to at least some extent. Accordingly, there is always some brine leakage from a solar evaporation zone. A solar evaporation process usually includes a succession of evaporation zones arranged for series flow. It is impractical to apply physical separation methods such as centrifugation to the crystal crop deposited in such a zone, particularly during the evaporation season. Brine entrained in crystal crop of any zone is thus effectively removed from the process and cannot be isolated for further concentration in subsequent zones.

The extent of brine entrainment by a crystal crop apparently depends upon the density of the brine in contact with the crystal crop and the physical nature of the crystal crop itself. Sodium chloride, the principle crystal constituent contacted by brine in commercial solar pond systems, entrains relatively little brine. Other crystal species, however, have much greater propensities to entrain brine and make solar concentration according to known techniques impractical. Thus, for example, it has been found that when brine taken from the Great Salt Lake of Utah is evaporated, it first deposits sodium chloride and then potassium-magnesium double salts, in the order: schoenite, kainite, carnallite. Sodium chloride and schoenite are deposited as relatively large crystals which entrain about 25 percent by weight brine. Kainite and carnallite are both deposited as relatively small crystals, and entrain a much greater weight-percent brine. Carnallite deposited under brine concentrated to about 75 moles $MgCl_2$ per 1,000 moles $H_2O$ contains about 80 weight-percent brine entrainment. By "weight-percent entrainment" is meant the weight of the brine entrained by a crystal crop divided by the total weight of the crystal crop, including the entrained brine.

It is not practical to produce bitterns brine by merely evaporating brine such as that from the Great Salt Lake in Utah in place of solar evaporation ponds. The ponds would run dry before the brine reached bitterns concentration with respect to $MgCl_2$; i.e. about 80 moles $MgCl_2$ per 1,000 moles $H_2O$. It is not even practical to evaporate in place brines already concentrated with respect to $MgCl_2$ to recover both a crystal crop containing kainite and carnallite and a residual bitterns brine. The crystal crop deposited in this fashion from brine containing about 40 moles $MgCl_2$ per 1,000 moles $H_2O$ entrain all of the brine in contact with the crystal crop.

The present application discloses a solar pond system of the general type disclosed in the parent applications and claims a system of subdivided evaporation zones particularly adapted for the production of bitterns brines.

SUMMARY OF THE INVENTION

The present invention is applicable to situations in which it is desired to concentrate a brine with respect to a particular soluble salt under conditions in which a crystal crop with a propensity to entrain a greater weight-percent of brine than does a sodium chloride crystal crop, particularly a sodium chloride crystal crop deposited earlier from the same brine, deposits in contact with the brine as it is being concentrated. It has been found advantageous, in such situations, to concentrate the brine in a first solar evaporation area until a portion of the high-entrainment crystal crop is deposited and to then decant the thus-concentrated brine. The decanted brine is transferred to a second solar evaporation area and is concentrated until a second portion of the high-entrainment crystal crop is deposited. Decanting, transferring and concentrating is continued in subsequent solar evaporation areas until the brine is concentrated to a predetermined desired concentration with respect to said particular soluble salt. The influent and effluent concentrations of each solar evaporation area, usually a subzone of a gross evaporation zone, are selected to minimize contact between the high-entrainment crystal crop and the more concentrated portions of the brine. The term "minimize" is not used in an absolute sense and is not intended to imply least possible contact. Rather, "to minimize contact" is convenient terminology for establishing and maintaining substantially reduced contact compared to the contact between dense brine and the crystal crop resulting when the brine is concentrated in a single solar evaporation area.

According to the present invention, a large evaporation zone of a solar pond system productive of a crystal species characterized by its high brine entrainment is subdivided into a plurality of subzones arranged for series flow. The gross concentration increase of the salt being concentrated; e.g., $MgCl_2$, across the zone is thus effected incrementally so that successive subzones contain brines of sequentially increasing concentration. The crystal crop produced in the zone is apportioned between the subzones so that each individual portion of the crystal crop is isolated from the bulk of the brine in the zone. As the brine becomes more concentrated with respect to the salt of interest; e.g., $MgCl_2$, and accordingly more dense, it contacts a relatively small volume of crystal crop. As a result, a much greater volume of brine of the desired effluent concentration may be withdrawn from the zone than is possible when the evaporation zone is operated conventionally, i.e., as a single pond. A correspondingly small proportion of the brine fed to the evaporation zone is lost as entrainment in the crystal crop.

The procedures of this invention are of benefit in any solar evaporation process wherein the brine stream flowing through the system becomes progressively more concentrated with respect to a salt, e.g., $MgCl_2$, it is desired eventually to recover. It is particularly beneficial, however, in evaporation zones wherein the propensity of the crystal crop to entrain brine increases markedly as the brine becomes more concentrated with respect to the salt of interest. Remarkable benefits are obtained when the invention is applied to the evaporation zones productive of kainite and carnallite crystal crops, particularly crystal crops which contain substantial proportions of carnallite, under brine being concentrated with respect to $MgCl_2$.

The term "evaporation zone," as used in this specification, refers to a major solar pond area intended for the deposition of as much as practicable of a particular mineral species. The zone may be operated to recover a substantially pure mineral, the brine being transferred from the zone before other mineral species precipitate in significant quantity, or it may be operated to recover substantially all of the desired species possible, together with other minerals which incidentally coprecipitate. In some instances, the purpose of the evaporation zone is to produce brine concentrated with respect to a particular salt without regard to the composition of the crystal crop produced in the evaporation zone.

In general, brine of a predetermined concentration with respect to its most soluble major salt is introduced to an evaporation zone and subjected to evaporative concentration to produce the desired crystal crop. By "major salt" is means a salt which it is commercially practicable to recover, as a solid or as a concentrated solution, by solar evaporation techniques. For example, LiCl, although more soluble than $MgCl_2$, is often present in such minute concentrations in $MgCl_2$ brines that its presence is ignored from a commercial standpoint. Effluent of a predetermined concentration with respect to the most soluble major salt is withdrawn from the first evaporation zone and is transferred to a subsequent evaporation zone. Although the precise composition of the crystal crop deposited at various locations within the evaporation zone usually differs, the particular desired species begins to crystallize at about the influent brine composition.

For example, in accordance with the disclosure of the aforesaid parent application Ser. No. 735,840, brines from the Great Salt Lake of Utah are introduced to a first evaporation zone and are subjected to evaporative concentration to produce a crystal crop of essentially pure sodium chloride. The effluent from this evaporation zone is mixed with recycle brines to adjust its composition and is evaporated further until it is concentrated with respect to potassium. It is then introduced to a kainite evaporation zone wherein it is subjected to evaporative concentration to produce a kainite crystal crop. When the brine is sufficiently concentrated with respect to $MgCl_2$ that carnallite begins to crystallize, it is withdrawn from the kainite zone and is introduced to a carnallite evaporation zone for the production of a carnallite crystal crop. Although the compositions of the crystal crop and the brine vary greatly within an evaporation zone, it is the gross effect of the evaporation accomplished within each zone that is of commercial interest. Thus, the objective of the process is to recover a kainite crystal crop from the kainite evaporation zone, and a carnallite crystal crop from the carnallite evaporation zone. Ideally, useful amounts of bitterns brine should be recovered from the carnallite evaporation zone for further processing. The entrainment characteristics of kainite and carnallite, particularly carnallite, are such that very little, if any, effluent can be withdrawn from a carnallite evaporation zone operated in known manner as a single pond. Recovery of bitterns brine from a carnallite evaporation zone operated as a single pond would require expensive extraction techniques and would at best be feasible only in conjunction with harvesting the carnallite crystal crop.

According to the present invention, the evaporation zones which produce crystal crops characterized by high entrainment; e.g., crystal crops containing substantial amounts of minerals with entrainment properties similar to kainite or carnallite, are divided into a plurality of subzones arranged for series flow. The density and composition of the brine entering the first subzone in the series and the density and composition of the effluent from the last subzone in a series are the same as the corresponding brines of an evaporation zone operated as a single pond. The influent and effluent brines of the intermediate subzones in the series are of sequentially higher intermediate compositions and densities, and the brine contained in each subzone is isolated from all of the crystal crop of the zone except the small portion contained by that particular subzone. In general, the greater the number of subzones in the series, the less brine is lost due to entrainment. Thus, where leakage from the pond is not an important factor, the greater the number of subzones, the greater the recovery of brine from the evaporation zone.

Ordinarily, for the practice of the present invention to be of substantial benefit, it is necessary to divide the evaporation zone into at least a certain minimum number of subzones which is determined from the entrainment characteristics of the crystal crop in contact with the brine contained in the zone. In the case of Great Salt Lake brines evaporated generally in accordance with the aforedescribed procedures of Ser. No. 735,840, the gross evaporation zone for the production of the carnallite crystal crop should be subdivided into at least about 4, preferably about 6 to about 20 subzones. Ideally, the kainite evaporation zone will be similarly subdivided. It is important to recognize that the divided zones taught by the present invention bear only superficial resemblance to expedients involving the use of divided evaporators. Such evaporators have been used in the salt industry to take advantage of the well-known property of low-density brines to evaporate more readily than brines of higher density. The present invention is sharply distinguishable from such evaporative techniques in purpose, approach and result.

Incidental to the practice of this invention is an improved evaporation efficiency because of the segregation of lower density brines in the initial subzones. This benefit does not contribute to the specific objective of the invention, however; namely, to increase the volume of dense brine withdrawn from the evaporation zone. Optimum operation in accordance with the present invention involves subdividing the evaporation zone to minimize contact between the crystal crop and the more concentrated brine in the zone. Accordingly, the zone is subdivided in such fashion that the largest practicable quantity of crystal crop contacts the least concentrated brine practicable, without particular regard to the evaporation rate of the brine. The subzones are in any event proportioned such that the weight ratio of dissolved salts in contact with solid salts in the zone is smaller than the corresponding ratio would be were the zone not so divided. The last subzone in the evaporation zone, which contains the densest portion of the brine, should contain as much brine and as little crystal crop as possible. The increased evaporation efficiency resulting from segregating the less dense brine permits maintaining a greater brine depth in the initial subzones than would ordinarily be permissible in the gross evaporation zone to maintain a satisfactory evaporation rate. It is preferred to maintain as great a brine depth as is feasible because a larger proportion of brine can then be decanted from the pond.

Because the volume of brine decreases as it flows from one subzone to the next, due to evaporation, entrainment, and leakage in the preceding subzone, it is desirable that subzones decrease in area long the series to maintain sufficient brine depth for decanting of the brine. As a general rule, for proper decantation, the brine depth in the pond, including entrained brine; i.e., the distance from the floor of the pond to the surface of the brine should be appreciably greater than the depth of the crystal crop deposited on the pond floor. Preferably, the brine depth should exceed the depth of the crystal crop by at least 6 inches.

Residence time, subzone area and depth, and influent and effluent brine concentrations of each subzone are selected on the basis of the entrainment characteristics of the crystal crop and brine in the evaporation zone. It is sometimes satisfactory to adjust these variables such that the density of the effluent brines from successive subzones increases by an approximately even increment, or by some other convenient linear relationship. Such control is not always advantageous, however, because brine entrainment may increase particularly rapidly over a relatively narrow range of density increase. In that case, more frequent brine transfers are desirable. More frequent brine transfers are also desirable in instances where the rate of deposition of the crystal crop is exceptionally high, even though the brine density may not increase proportionately.

It is well understood by those skilled in the art that the specific minerals referred to by name herein and in the claims are discrete substances having characteristic X-ray diffraction patterns, physical properties, and chemical compositions. Although it is recognized that individual ions are contained within a mineral crystal in spatial relationships dependent upon the structure of the mineral itself, it is nevertheless conventional to describe the chemical composition of a mineral as a combination of inorganic salts, often including crystal water. According to this practice, the minerals referred to herein and in the claims have chemical compositions as follows:

| Kainite: | $KCl \cdot MgSO_4 \cdot 2.75 H_2O$ |
| Schoenite: | $K_2SO_4 \cdot MgSO_4 \cdot 6H_2O$ |
| Carnallite: | $KCl \cdot MgCl_2 \cdot 6H_2O$ |
| Epsomite: | $MgSO_4 \cdot 7H_2O$ |

$MgCl_2$-concentration for incremental crystal crops produced by evaporating brine taken from the Great Salt Lake of Utah;

FIG. 2, a flow sheet illustrating the relationship of gross evaporation zones in a solar evaporation system treating similar brines; and FIG. 3, a diagrammatic representation of the gross evaporation zones of FIG. 2 divided into subzones.

DESCRIPTION OF THE ILLUSTRATED EMBODIMENT

The curve of FIG. 1 was derived experimentally by evaporating brine taken from the Great Salt Lake of Utah, and decanting the brine at intervals as the concentration of $MgCl_2$ increased to recover incremental crystal crops. The crystal crops were centrifuged to extract the entrained brine, and the data were plotted as illustrated. The approximate mineral composition of the crystal crops produced at several indicated brine compositions are reported in table 1.

TABLE 1.—APPROXIMATE MINERAL COMPOSITIONS OF CRYSTAL CROPS PRODUCED BY THE EVAPORATION OF BRINE TAKEN FROM THE GREAT SALT LAKE OF UTAH

| Brine composition (Fig. 1) | Weight percent composition (excluding entrainment) | | | | |
|---|---|---|---|---|---|
| | NaCl | Schoenite | Kainite | Carnallite | Epsomite |
| A | 100 | | | | |
| B | 70 | 30 | | | |
| C | 50 | 20 | 10 | | 20 |
| D | 25 | | 60 | | 15 |
| E | 17 | | 38 | 25 | 20 |
| F | 11 | | | 69 | 20 |

Both NaCl and schoenite crystallized as relatively coarse crystal crops which entrained about 25 percent by weight brine. When the brine was concentrated to about 45 moles $MgCl_2$ per 1,000 moles $H_2O$, the nature of the crystal crop changed markedly in character because the potassium values began to crystallize from solution as kainite instead of as schoenite.

A corresponding change in the entrainment characteristics of the crystal crop is dramatically illustrated by FIG. 1.

The region of the curve between the points marked C and E corresponds to brine compositions which would normally be present in the kainite evaporation zone of a solar pond system such as illustrated by FIG. 2. Similarly, the region of the curve between points D and F corresponds to the approximate composition range of brine present in the carnallite evaporation zone of such a system. The crystal crops upon which these regions of the curve are based correspond closely to those which would be in contact with the brines in commercial practice. A surprising and unpredictable phenomenon evidenced by the plot of FIG. 1 is that the weight-percent entrainment of brine in the crystal crop remains relatively constant over a wide range of $MgCl_2$ concentration, even when the nature of the crystal crop changes significantly; i.e., when potassium precipitates from solution as schoenite. The weight-percent brine entrainment over the kainite and carnallite regions of the curve increases very rapidly with greater concentrations of magnesium chloride in the brine.

Although the evaporation of Great Salt Lake brine in the large evaporation zones of FIG. 2 operated as single ponds will produce desirable potassium-containing crystal crops, little, if any, bitterns brine can be decanted from the carnallite evaporation zone. To insure good yields of bitterns brine by simple decantation techniques, both the kainite evaporation zone and the carnallite evaporation zone are divided into a number of subzones as illustrated by FIG. 3.

Referring to FIG. 3, the kainite evaporation zone is divided into 4 subzones designated K–1 through K–4, respectively, and the carnallite evaporation zone is similarly divided into 6 subzones, designated C–1 through C–6, respectively. The subzones are typically formed by diking off sections of the gross evaporation zones so that brine flows at a controlled rate from K–1 through the series of kainite subzones to K–4 which produces a carnallite-concentrated effluent brine, typically containing at least 60 moles, preferably at least about 55, moles $MgCl_2$ per 1,000 moles $H_2O$. The effluent brine is introduced to carnallite subzone C–1, to flow through the series of carnallite subzones to subzone C–6 which produces effluent of bitterns brine composition, typically with a $MgCl_2$ concentration of about 85 moles per 1,000 moles $H_2O$. Generally, the carnallite evaporation zone will be much smaller than the kainite zone, as illustrated, typically containing less than about 20 percent as much evaporation area to maintain adequate brine depth for decanting.

Table 2 reports typical compositions of influent and effluent brines of kainite and carnallite evaporation zones divided into subzones as illustrated by FIG. 3 and typical entrainment data for the crystal crops in each subzone.

TABLE 2.—BRINE COMPOSITIONS AND ENTRAINMENT DATA FOR A SOLAR POND SYSTEM ACCORDING TO THE INVENTION

| Brine stream | Moles $MgCl_2$ per 1,000 moles $H_2O$ | Weight-percent Mg | Weight-percent brine entrainment of crystal crop in sub-zone | Relative area of sub-zone |
|---|---|---|---|---|
| K–1 influent | 40 | 5.4 | 25 | |
| K–1 effluent, K–2 influent | 50 | 6.0 | 27 | 100 |
| K–2 effluent, K–3 influent | 58 | 6.5 | 32 | 90 |
| K–3 effluent, K–4 influent | 63 | 6.8 | 39 | 80 |
| K–4 effluent, C–1 influent | 65 | 7.0 | 43 | 70 |
| C–1 effluent, C–2 influent | 72 | 7.4 | 70 | 30 |
| C–2 effluent, C–3 influent | 75 | 7.6 | 75 | 27 |
| C–3 effluent, C–4 influent | 78 | 7.8 | *79 | 24 |
| C–4 effluent, C–5 influent | 82 | 8.0 | *80 | 21 |
| C–5 effluent, C–6 influent | 83 | 8.1 | *80 | 18 |
| C–6 effluent | 85 | 8.2 | *80 | 15 |

*Approximately.

I claim:

1. In the production of bitterns brine by subjecting brines containing, as dissolved constituents, salts of magnesium and salts less soluble than said magnesium salts to evaporative concentration in a large solar evaporation zone to obtain a crystal crop of selected mineral composition containing said less soluble salts and an effluent brine more concentrated with respect to magnesium than is the brine introduced to said evaporation zone; separating the effluent brine and repeating the evaporation procedure in subsequent solar evaporation zones to produce other crystal crops of different selected mineral compositions containing said less soluble salts as required until the effluent brine obtained from the last such evaporation zone has the composition of bitterns brine, the improvement which comprises:

dividing the evaporation zone from which the effluent brine has the composition of bitterns brine into a plurality of subzones arranged for series flow;

introducing the normal influent brine of said zone to the first subzone in said series of subzones and thereafter transferring brine from each subzone to the next subzone in the series up to the last said subzone;

holding the brine in each subzone until it is concentrated a predetermined increment higher than the concentration of the influent to that subzone, thereby depositing a portion of the crystal crop of said zone in each said subzone out of contact with most of the brine contained within said zone so that the weight ratio of dissolved salts in contact with solid salts in the total zone is smaller than the corresponding ratio would be were the zone not divided into said series of subzones; and withdrawing brine from the last said subzone concentrated to the normal effluent brine concentration of said zone.

2. The improvement of claim 1 wherein each solar evaporation zone wherein the entrainment of the effluent brine in the crystal crop produced therefrom is significantly greater than the entrainment of the influent brine in the crystal crop produced therefrom is so subdivided.

3. The improvement of claim 1 wherein brine is evaporated in a gross solar carnallite evaporation zone to produce carnallite and a residual brine concentrated to bitterns composition with respect to $MgCl_2$; and said carnallite evaporation zone is subdivided into at least 4 subzones.

4. The improvement of claim 3 wherein the carnallite evaporation zone is subdivided into between about 6 and about 20 subzones.

5. The improvement of claim 3 wherein the brine is evaporated in a gross kainite-evaporation zone prior to being evaporated in said carnallite evaporation zone; the kainite zone is subdivided into at least 4 subzones; and the effluent from the last subzone of the kainite evaporation zone is introduced to the first subzone of the carnallite evaporation zone.

6. The improvement of claim 1 wherein brine from the Great Salt Lake of Utah is subjected to evaporative concentration in a solar evaporation zone to produce a crystal crop and an effluent brine concentrated to at least 55 moles $MgCl_2$ per 1,000 moles $H_2O$; and said effluent brine is introduced to a carnallite evaporation zone for the production of a carnallite crystal crop and carnallite effluent brine of bitterns composition.

7. The improvement of claim 6 wherein the effluent brine from the carnallite-evaporation zone is concentrated to at least about 80 moles $MgCl_2$ per 1,000 moles $H_2O$.

8. The improvement of claim 6 wherein said Great Salt Lake brine is evaporated to produce an effluent brine concentrated to at least about 40 moles $MgCl_2$ per 1,000 moles $H_2O$; said effluent brine is introduced to a kainite evaporation zone to produce a kainite effluent brine concentrated to at least 55 moles $MgCl_2$ per 1,000 moles $H_2O$, said kainite evaporation zone being subdivided into at least 4 subzones; and said kainite effluent is introduced to a carnallite evaporation zone for the production of carnallite effluent brine of bitterns composition.

9. The improvement of claim 8 wherein the carnallite evaporation zone is subdivided into about 4 to about 20 subzones.

10. In the concentration of a brine with respect to a particular soluble salt under conditions in which a crystal crop with a propensity to entrain a greater weight-percent of brine than does a sodium chloride crystal crop is deposited in contact with said brine while it is being concentrated, the improvement which comprises;

concentrating the brine in a first solar evaporation area until a portion of said crystal crop is deposited;

decanting the thus-concentrated brine and transferring it to a second solar evaporation area;

further concentrating said brine in said second solar evaporation area until a second portion of said crystal crop is deposited; and continuing to decant, transfer, and concentrate said brine in subsequent solar evaporation areas until said brine is concentrated to a predetermined concentration with respect to said particular soluble salt, the influent and effluent brine concentrations of each said solar evaporation area being selected to minimize the contact between said crystal crop and the more concentrated portions of said brine.

PO-1050
(5/69)

UNITED STATES PATENT OFFICE
CERTIFICATE OF CORRECTION

Patent No. 3,615,259          Dated October 26, 1971

Inventor(s)    Ulrich E. G. Neitzel

It is certified that error appears in the above-identified patent and that said Letters Patent are hereby corrected as shown below:

Col. 2, line 19, change "in" to --of--;

line 28, change "entrain" to --entrains--;

Col. 4, line 73, change "long" to --along--;

Col. 5, after line 36, insert--

Description of the Drawings

In the drawings, which illustrate what is presently regarded as the best mode for practicing the invention:

FIG. 1 is a plot of weight-percent brine entrainment versus --.

Signed and sealed this 2nd day of May 1972.

(SEAL)
Attest:

EDWARD M. FLETCHER, JR.          ROBERT GOTTSCHALK
Attesting Officer                  Commissioner of Patents